United States Patent [19]

Savage et al.

[11] Patent Number: 4,919,876
[45] Date of Patent: Apr. 24, 1990

[54] METHOD FOR MAKING COMPOSITE TREAD FOR TRACK-LAYING VEHICLES

[75] Inventors: Russell C. Savage; Gary P. Zeller; Martin D. Skirha, all of Anderson, Ind.

[73] Assignee: General Motors Corporation, Detroit, Mich.

[21] Appl. No.: 257,590

[22] Filed: Oct. 14, 1988

Related U.S. Application Data

[62] Division of Ser. No. 141,965, Jan. 11, 1988, Pat. No. 4,880,283.

[51] Int. Cl.⁵ .............................................. B29C 45/14
[52] U.S. Cl. ..................... 264/258; 264/275; 264/279.1; 264/328.2; 264/328.6
[58] Field of Search ............. 264/271.1, 273, 274, 264/279.1, 328.2, 328.6, 257, 258, 275; 428/289, 263, 492, 247; 305/35 R, 35 EB, 38, 39, 51

[56] References Cited

U.S. PATENT DOCUMENTS

| | | | |
|---|---|---|---|
| 1,886,839 | 11/1932 | Scheckel | 305/38 |
| 2,917,347 | 12/1959 | Reuter et al. | 305/38 |
| 3,870,380 | 3/1975 | Korner | 305/36 |
| 3,948,572 | 4/1976 | Korner et al. | 305/57 |
| 4,420,570 | 12/1983 | Dominguez | 264/328.2 |
| 4,792,576 | 12/1988 | Nodelman | 264/328.6 |

Primary Examiner—Willard Hoag
Attorney, Agent, or Firm—Randy W. Tung

[57] ABSTRACT

A composite tread member used in a track for a track-laying vehicle. The tread member is molded of a polymeric material reinforced with abrasion resistant fibers. It can be molded in a reaction injection molding process or in a resin transfer molding process by first placing a metal support member and a plurality of reinforcing fiber bundles in the mold and then inject a polymeric matrix material into the mold. The reinforcing fiber bundles used in our novel composite tread member can be first interwoven with polyester fiber bundles into narrow webbing and then rolled up in elongated rolls or pleated in pleats of predetermined width and thickness. The polymeric matrix material used in the composite tread member can be either a Nylon 6 RIM, a polyurethane RIM, or a polyurea RIM material. Our novel composite tread members have superior abrasion resistant properties and durability when compared to a conventional unreinforced tread member.

2 Claims, 2 Drawing Sheets

METHOD FOR MAKING COMPOSITE TREAD FOR TRACK-LAYING VEHICLES

This is a division of application Ser. No. 141,965 filed on Jan. 11, 1988, now U.S. Pat. No. 4,880,283

FIELD OF THE INVENTION

The present invention generally relates to a composite tread member for a track-laying vehicle and, more particularly, it is concerned with a composite tread member for a track-laying vehicle that is molded of a polymeric material reinforced with abrasion resistant fibers.

BACKGROUND OF THE INVENTION

Track-laying vehicles are broadly used in construction or military applications for their superior tracking capability in rough terrain. A track on a track-laying vehicle is under tremendous strain and severe wearing conditions when the vehicle is in operation. This is especially true with modern track-laying vehicles where the vehicle is expected to carry a high load and capable of superior acceleration and speed.

A track on a track-laying vehicle can be constructed with either an integral tread system or a replaceable tread system. In the integral tread system, a track is connected by many track units, each is molded of hard rubber material around a steel support member. A track with the integral tread system has the benefit of lightweight, however, the entire track must be replaced when the tread rubber surface is worn.

In a track equipped with replaceable tread members, individual tread members are connected by mechanical means to a permanent steel link unit and can be replaced when they are worn. The replaceable tread track can therefore be more easily maintained in the operation of a track-laying vehicle.

Conventional tread members are molded of hard rubber materials. The durability of the rubber and thus the lifetime of a tread is always a problem in the design of a track. The selection of the rubber material is a difficult task in that different performance requirements of a track-laying vehicle demand different properties of the rubber material. For instance, a high durometer hard rubber material used in molding a tread member works well at high speed on smooth roads but disintegrates quickly in rough terrain. On the other hand, a low durometer soft rubber material would work well in rough terrain but deteriorates quickly on smooth roads at high speeds.

The most commonly seen problems with rubber molded tread members are overheating which causes blowouts and catastrophic failure of the rubber, chunking where large pieces of the rubber materials fall off the tread member, and rapid wear due to the poor abrasion resistance of the rubber material. In military applications, the high thermal profile of rubber is also undesirable since a track-laying vehicle such as a tank can be easily detected in the dark by infrared detectors.

It is, therefore, an object of the present invention to provide a new composite tread member which can be used in a track-laying vehicle equipped with either an integral tread system or a replaceable tread system.

It is another object of the present invention to provide a composite material for the molding of a tread member used on a track-laying vehicle capable of long surface life and problem-free operations.

It is a further object of the present invention to provide a polymeric composite material for the molding of a tread member used on a track-laying vehicle capable of providing prolonged surface life without premature failures.

SUMMARY OF THE INVENTION

The present invention provides a new and novel composite tread member for a track-laying vehicle that is molded of a polymeric material, or a polymeric matrix material, reinforced with abrasion resistant fibers. The polymeric matrix material we have employed is a Nylon 6 based reaction injection molding (RIM) material. In our composite tread member, a metal support member in the shape of a binoculus is embedded in the polymeric material forming the back portion of the tread member. The binoculus-shaped metal support member functions as the mounting hardware such that the tread member may be connected to the track. Reinforcing fibers arranged in various bundle sizes and configurations are embedded in the polymeric matrix material forming the front portion, i.e., the portion constituting the wear surface of the tread member.

In the preferred embodiment of our invention, the reinforcing fibers we have used are bundles of polyaramid fibers. A multiplicity of polyaramid fiber bundles are interwoven with polyester fiber bundles into a narrow webbing of approximately 2 to 3 inches wide with the polyaramid fiber bundles running in the transverse direction. The webbing is then rolled up in an elongated roll and embedded in a polymeric matrix material. In an alternate embodiment of our invention, the webbing is folded up into a pleated form and then embedded in a polymeric matrix material. In either of these embodiments, the polyaramid fiber bundles are embedded in the polymeric matrix material in such a way that the fiber bundles are situated in a near perpendicular relationship to the wear surface of the composite tread member. We have found that maximum wear resistance of the tread member can be achieved when polyaramid fiber bundles are embedded in such an orientation.

Our novel composite tread members can be operated on a track-laying vehicle at an operating temperature that is at least 25° F. lower than the operating temperature of a conventional rubber tread member. Our composite tread members have performed with minimum cracking, chunking, or blowout problems after extensive testing in rough terrain. The tread members have demonstrated an average durability that is 50% longer than that for an unreinforced conventional tread member.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED AND ALTERNATE EMBODIMENTS

Figure 1:
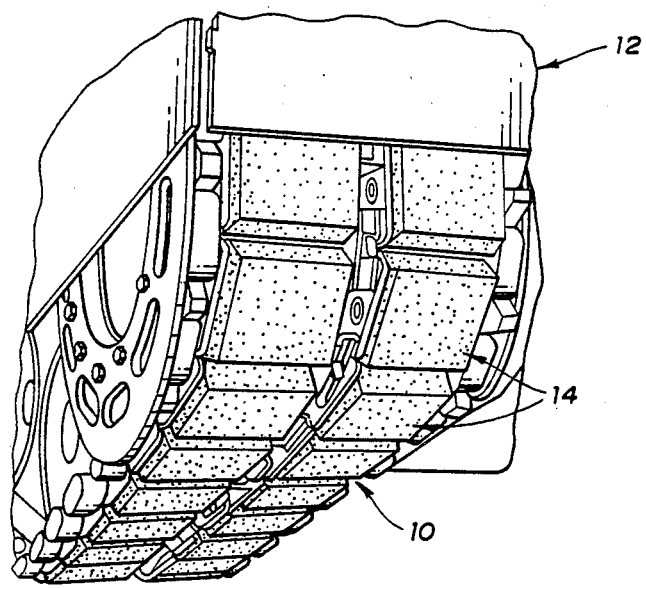
FIG. 1 is a perspective view showing a partial track mounted on a track-laying vehicle equipped with our composite tread members.
Figure 2:
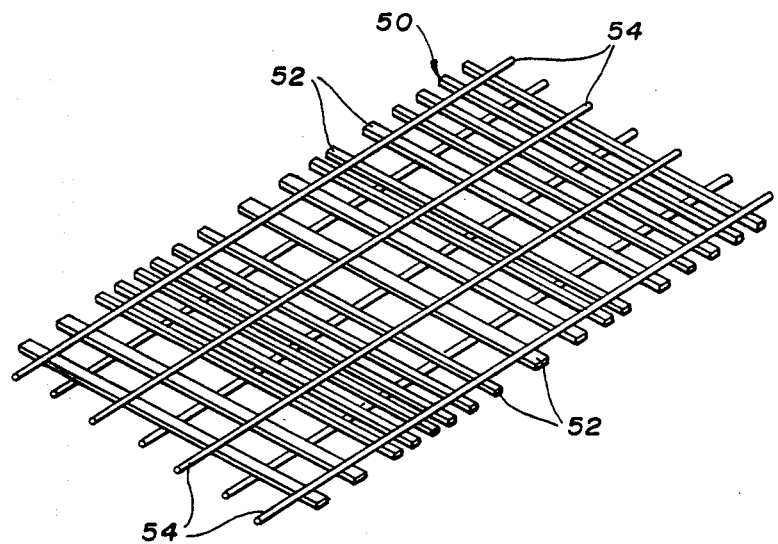
FIG. 2 is an enlarged view of the webbing interwoven by polyaramid fiber bundles and polyester fiber bundles with the polyaramid fiber bundles running in the transverse direction.

Referring initially to FIG. 1, a partial track 10 of a track-laying vehicle 12 is shown. Composite tread members 14 are mounted in track 10 by mechanical means. In FIG. 2, a section of a polyaramid fiber webbing 50 is shown. A multiplicity of polyaramid fiber bundles 52 are interwoven with polyester fiber bundles 54 making webbing 50 with the polyaramid fiber bundles 52 running in the transverse direction. The function of the polyester fiber bundles 54 is to hold the polyaramid fiber bundles 52 in the desired orientation. The polyaramid fiber bundles we used is supplied by the DuPont company under the tradename of Kevlar ®. It is Kevlar ® 29 having a denier of 1500. Each Kevlar ® fiber webbing contains 7-10 bundles per inch. The polyester fiber bundles we used for keeping the polyaramid fibers in place is an industrial polyester having a denier of 1000 and containing 4 fibers per inch in each webbing.

Figure 3:
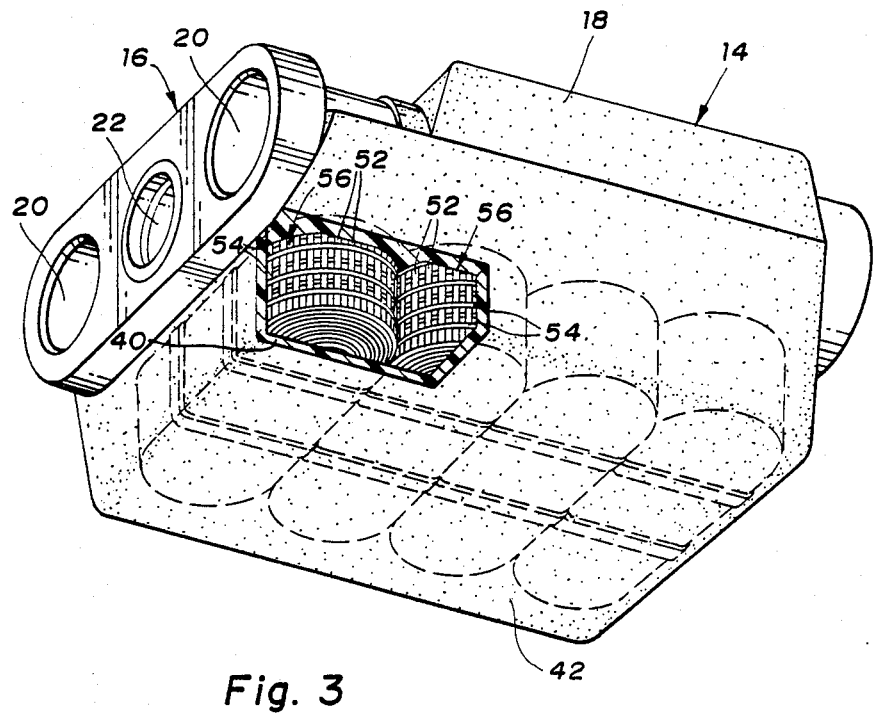
FIG. 3 is a perspective view containing a partial cut-away view showing a composite tread member reinforced with polyaramid fiber webbing arranged in an elongated roll form.
Figure 4:
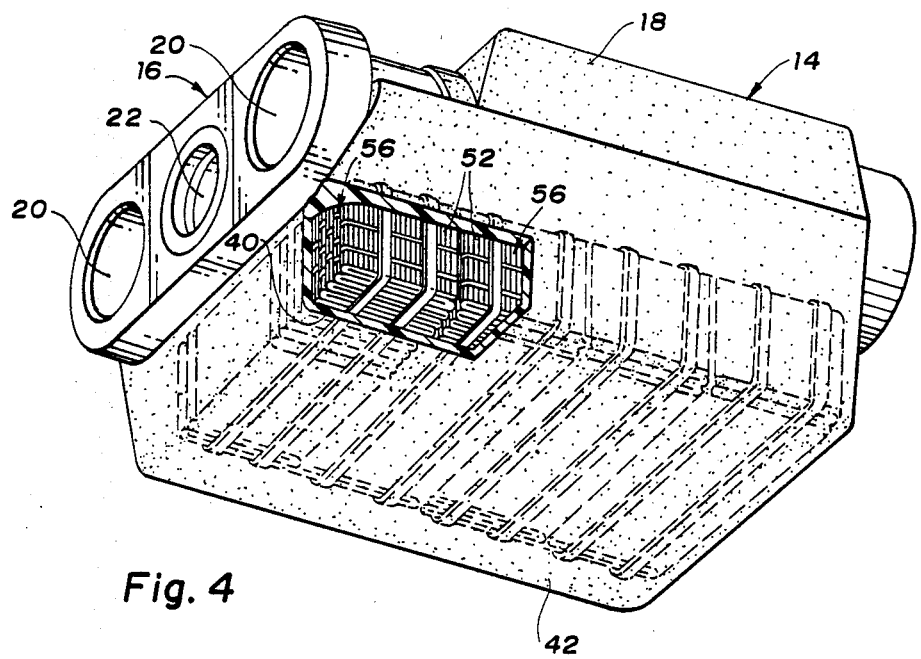
FIG. 4 is a perspective view containing a partial cut-away view showing a composite tread member reinforced with polyaramid fiber webbing arranged in a pleat form.

A perspective view of a composite tread member with a partial cut-away view is shown in FIG. 3. A metal support member 16 is embedded in the back portion of tread member 14 by polymeric matrix material 18. The metal support member 16 having a binoculus shape is equipped with mounting apertures 20 for connecting to the track and a heat dissipation aperture 22. The heat dissipation aperture 22 serves not only to dissipate heat generated in tread member 14 during operation, but also to minimize the amount of polymeric material used. We have also used metal support members that do not contain the heat dissipation aperture. Bolt members (not shown) are used to connect tread member 14 to track 10 (FIG. 1) through aperture 20. In the cut-away view in FIG. 3, elongated rolls 56 of polyaramid fiber webbing are embedded by polymeric matrix material 18 in the front portion of tread member 14. The elongated rolls 56 are covered by a thin layer 40 of the polymeric matrix material on wear surface 42 of the tread member.

In the next step of making our composite tread members, a multi-cavity Kirksite tool having matched upper and lower mold members (not shown) gated at parting line is used for the RIM injection molding process. A more expensive aluminum or steel tool may also be used in place of the Kirksite tool. The interior mold surfaces of the upper and the lower mold members define a mold cavity. Elongated rolls 56 of polyaramid fiber webbing 56 are first placed in the lower mold member. A metal support member 16 is then placed on top of the elongated rolls 56. After the upper mold member is closed and locked onto the lower mold member forming a mold cavity containing rolls 56 and metal support member 16, Nylon 6 RIM material is injected into the mold. A molded tread member 14 can be demolded after the RIM material is cured in approximately 3-5 minutes. The RIM injection molding process is conducted in a RIM machine or a RIM (Resin Transfer Molding) machine at low molding pressures between 50 to 100 psi. The Nylon 6 RIM components are kept in tanks at a temperature between 150°-200° F. with the mold temperature set at 250° F.

We have used two different types of Nylon 6 RIM material. Table I shows the formulation for a hard Nylon 6 RIM material having a Shore D durometer of 75-80. Table II shows the soft Nylon 6 RIM material which has a Shore D durometer between 35-38. We have made tread members from both the soft RIM formulation and the hard RIM formulation.

TABLE I
HARD NYLON 6 RIM COMPOSITION

| | Parts by Weight |
|---|---|
| A-Part | |
| Polyether Polyol Prepolymer (Monsanto P-1) | 21.9 |
| Caprolactam (Nipro) | 27.1 |
| Antioxidant (Monsanto Flectol ® H) | 0.5 |
| B-Part | |
| Caprolactam (Nipro) | 38.8 |
| Magnesium Bromide Catalyst (Monsanto C-1) | 11.2 |

TABLE II
SOFT NYLON 6 RIM COMPOSITION

| | Parts by Weight |
|---|---|
| A-Part | |
| Polytetramethylene Polyol Prepolymer (Monsanto P-4) | 43.7 |
| Caprolactam (Nipro) | 5.4 |
| Antioxidant (Monsanto Flectol ® H) | 0.44 |
| B-Part | |
| Caprolactam (Nipro) | 42.5 |
| Magnesium Bromide Catalyst (Monsanto C-1) | 7.5 |

FIG. 3 shows a composite tread member reaction injection molded of Nylon 6 RIM material. It is seen that polyaramid fiber bundles 52 are oriented about perpendicularly to the wear surface 42 of tread member 14 to obtain the maximum abrasion resistance. We have reason to believe that even when polyaramid fiber bundles are oriented at a small angle, i.e. up to 30°, from being perpendicular to the wear surface of the tread member, the abrasion resistance of the tread member only suffers slightly. We have also used other abrasion resistant fibers such as glass fibers and Nylon fibers which produced satisfactory results.

Other materials can be used in place of Nylon 6 RIM as the polymeric matrix material in our composite tread members. For instance, polyurethane RIM, polyurea RIM or any other polymeric material that has good abrasion resistant property can be used. We have found specifically that polyurethane RIM and polyurea RIM work satisfactorily as the polymeric matrix material in our composite tread member.

In our alternate embodiment, pleats of polyaramid fiber webbing obtained by folding the webbing back and forth on itself are used in place of the elongated rolls of polyaramid fiber webbing. In this process, narrow webbing of polyaramid fiber bundles interwoven with polyester fiber bundles is pleated at a predetermined width and thickness. The desirable width and thickness of the pleats can be easily determined by the geometry of the composite tread member. We have found that a suitable pleat size for our polyaramid fiber webbing is about 2 to 3 inches in width and about 4 to 5 inches in thickness.

The pleated form of polyaramid fiber webbing we used in our alternate embodiment has similar wear properties to the roll form of polyaramid fiber webbing used in the preferred embodiment. They both significantly increased the wear resistance of our composite tread members. Furthermore, the common operational problems associated with conventional unreinforced tread members are greatly reduced.

From the foregoing, it should be apparent that the present invention provides a novel composite tread member that is far superior in properties and durability when compared to conventional unreinforced tread members.

While this invention has been described in an illustrative manner, it should be understood that the terminology used is intended to be in the nature of words of description rather than of limitation.

Furthermore, while our invention has been described in terms of a preferred and an alternate embodiment thereof, it is to be appreciated that those skilled in the art will readily apply these teachings to other possible variations of the invention.

The embodiments of the invention in which an exclusive property or privilege is claimed are defined as follows:

1. A method for making a composite tread member having a metal support member embedded in an abrasion resistant fiber reinforced polymeric material by a reaction injection molding process in a matched upper and lower mold members having interior mold surfaces defining a mold cavity therein comprising the steps of:
   positioning a multiplicity of an abrasion resistant fiber bundles in the lower mold member in an orientation such that said fiber bundles being in an about perpendicular relationship to said interior mold surface of said lower mold member,
   said multiplicity of fiber bundles being arranged in elongated rolls formed by rolling narrow webbing of polyaramid fiber bundles interwoven with polyester fiber bundles with the polyaramid fiber bundles running in the transverse direction,
   placing a metal support member on top of said fiber bundles,
   closing said upper mold member onto said lower mold member forming a mold cavity therein,
   injecting a quantity of a reaction injection moldable polymeric material into said mold cavity and thus embedding said fiber bundles and said metal support member, and
   demolding said composite tread member after said polymeric material is cured in said mold cavity.

2. A method for making a composite tread member having a metal support member embedded in an abrasion resistant fiber reinforced polymeric material by a reaction injection molding process in a matched upper and lower mold members having interior mold surfaces defining a mold cavity therein comprising the steps of:
   positioning a multiplicity of an abrasion resistant fiber bundles in the lower mold member in an orientation such that said fiber bundles being in an about perpendicular relationship to said interior mold surface of said lower mold member,
   said multiplicity of fiber bundles being arranged in pleats of predetermined width and thickness made by pleating narrow webbing of polyaramid fiber bundles interwoven with polyester fiber bundles with the former running in the transverse direction,
   placing a metal support member on top of said fiber bundles,
   closing said upper mold member onto said lower mold member forming a mold cavity therein,
   injecting a quantity of a reaction injection moldable polymeric material into said mold cavity and thus embedding said fiber bundles and said metal support member, and
   demolding said composite tread member after said polymeric material is cured in said mold cavity.

* * * * *